(12) United States Patent
Jung et al.

(10) Patent No.: US 8,144,791 B2
(45) Date of Patent: Mar. 27, 2012

(54) APPARATUS, METHOD, AND MEDIUM FOR VIDEO SYNCHRONIZATION

(75) Inventors: Choon-sik Jung, Suwon-si (KR); Cheul-hee Hahm, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1428 days.

(21) Appl. No.: 11/174,507

(22) Filed: Jul. 6, 2005

(65) Prior Publication Data

US 2006/0018387 A1 Jan. 26, 2006

(30) Foreign Application Priority Data

Jul. 22, 2004 (KR) .................. 10-2004-0057144

(51) Int. Cl.
*H04B 1/66* (2006.01)
*H04N 7/12* (2006.01)
*H04N 11/02* (2006.01)
*H04N 11/04* (2006.01)

(52) U.S. Cl. ......... 375/240.28; 375/240.11; 375/240.12; 375/240.13; 375/240.14; 375/240.25; 375/240.26

(58) Field of Classification Search ............ 375/240.28, 375/240.11–240.14, 240.25–240.26
See application file for complete search history.

(56) References Cited

U.S. PATENT DOCUMENTS

| | | | |
|---|---|---|---|
| 5,559,999 A | | 9/1996 | Maturi et al. |
| 5,668,601 A | * | 9/1997 | Okada et al. ............. 375/240.25 |
| 6,011,869 A | * | 1/2000 | Ohta et al. .................... 382/233 |
| 6,556,626 B1 | * | 4/2003 | Iganami .................. 375/240.25 |

FOREIGN PATENT DOCUMENTS

| | | |
|---|---|---|
| JP | 2002-10214 | 1/2002 |
| JP | 2002-10271 | 1/2002 |
| JP | 2002-330436 | 11/2002 |
| JP | 2002-369209 | 12/2002 |
| KR | 0181027 | 12/1998 |
| KR | 2002-80703 | 10/2002 |
| KR | 10-2004-0010960 | 2/2004 |
| KR | 2004-10960 | 2/2004 |

OTHER PUBLICATIONS

Korean Office Action issued Mar. 20, 2006 in Korean Patent Application No. 10-2004-0057144 which corresponds to U.S. Appl. No. 11/174,507.

* cited by examiner

*Primary Examiner* — Christopher Kelley
*Assistant Examiner* — Hee-Yong Kim
(74) *Attorney, Agent, or Firm* — Staas & Halsey LLP

(57) ABSTRACT

An apparatus, method, and medium for video synchronization are provided. The apparatus may include a PTS register storing a presentation time stamp (PTS) of a picture to be reproduced and skip enable flag information indicating whether the picture can be skipped, by using a position of the picture in a video decoder buffer in which pictures to be decoded are stored; and a controller controlling the picture reproduction by skipping, repeating, or reproducing the picture with reference to the PTS and the skip enable flag information stored in the PTS register.

18 Claims, 8 Drawing Sheets

FIG. 4

PICTURE HEADER QUEUE (225)

| PICTURE TYPE | POSITON OF CORRESPONDING PICTURE IN BUFFER |
|---|---|
| I | 100 |
| P | 200 |
| ⋮ | ⋮ |
| B | 400 |
| ⋮ | ⋮ |
| P | 700 |
| I | 800 |
| ⋮ | ⋮ |

FIG. 5

PTS QUEUE (226)

| PTS | POSITON OF CORRESPONDING PICTURE IN BUFFER |
|---|---|
| 100 | 100 |
| 200 | 400 |
| 300 | 700 |
| ⋮ | ⋮ |

APPARATUS, METHOD, AND MEDIUM FOR VIDEO SYNCHRONIZATION

CROSS-REFERENCE TO RELATED APPLICATIONS

This application claims the benefit of Korean Patent Application No. 10-2004-0057144, filed on Jul. 22, 2004, in the Korean Intellectual Property Office, the disclosure of which is incorporated herein in its entirety by reference.

BACKGROUND OF THE INVENTION

1. Field of the Invention

The present invention relates to video reproduction, and more particularly, to an apparatus, method, and medium for video synchronization.

2. Description of the Related Art

Typical Moving Picture Experts Group (MPEG) sync scheme performs video synchronization according to information called a time stamp for decoding and reproducing input video pictures. After the synchronization of the video pictures, the MPEG sync scheme also performs picture Skipping/Repeating at uniform time intervals so as to prevent a decoding buffer from overflow/underflow. Picture Skipping denotes skipping a current picture to be transmitted and dealing with the next picture. Picture Repeating denotes reproducing a same picture repeatedly until a predetermined time. At this time, from video pictures input as IBBPBBP or IPPPP, only the B-type picture or the last picture of GOP (Group of Picture), excluding a reference picture, should be skipped.

FIG. 1 is a schematic block diagram of a conventional digital broadcast receiver.

Referring to FIG. 1, the digital broadcast receiver that receives and reproduces video signals includes a transport stream (TS) de-multiplexer 110, a digital phase locked loop (D-PLL) 120, comparators 130 and 140, a video decoder buffer 150, a video decoder 160, a frame reorder buffer 170, and a video display 180.

The TS de-multiplexer 110 receives transmitted streams, de-multiplexes a plurality of programs, and extracts parameters for video reproduction and synchronization. Here, the demultiplexed data and the extracted parameters may include encoded video streams to be forwarded to the video decoder buffer 150, a decoding time stamp DTS indicating when the video data should be decoded, and a presentation time stamp PTS indicating when the video data should be reproduced. A signal, denoted as PCR (Program Clock Reference), also output by the TS de-multiplexer 110, is time administration information for synchronizing a reference frequency of the receiver with that of the transmitter.

The D-PLL 120 receives the PCR and synchronizes the reference frequency of the receiver with that of the transmitter.

The comparator 130 compares the DTS indicating a decoding time of a video picture to a reference time, and generates a control signal for decoding time. A reference time may be referred to as a system time clock (STC).

The comparator 140 compares the PTS indicating a reproducing time of a video picture to a reference time (STC), and generates a control signal for reproduction time.

The video decoder buffer 150 receives and stores the de-multiplexed video stream from the TS de-multiplexer 110.

The video decoder 160 decodes video data received from the video decoder buffer 150 into a picture image. Here, the encoded video data is decoded at a designated time according to the DTS, and the resulting decoded video data is stored in a picture buffer (not shown).

The frame reorder buffer 170 re-orders decoded I-(type) pictures and P-(type) pictures received from the video decoder 160 and outputs the results to the video display 180. However, the frame reorder buffer 170 passes decoded B-pictures received from the video decoder 160 to the video display as they are.

The video display 180 displays I- and P-pictures reordered by the frame reorder buffer 170, and B-pictures output by the video decoder 160. That is, each picture data stored in the picture buffer is reproduced by the video display 180 at a designated time according to the PTS.

As such, conventional MPEG sync scheme performs video synchronization according to information called time stamps for video picture decoding and reproducing. By this sync scheme, video pictures are synchronized, and in order to prevent decoding buffer overflow/underflow, picture Skipping/Repeating is performed at uniform time intervals. At this time, from video pictures input as, for example, IBBPBBP, or IPPPP, only the B-picture or the final picture of GOP, excluding a reference picture used for forming other images, should be skipped, if skipping is needed for lip sync or the prevention of overflow/underflow. For this, it is necessary to predict pictures that will be skipped. However, a possible error in the prediction may lead to picture distortion.

SUMMARY OF THE INVENTION

Additional aspects, features, and/or advantages of the invention will be set forth in part in the description which follows and, in part, will be obvious from the description, or may be learned by practice of the invention.

The present invention provides an apparatus, method, and medium of video synchronization, which eliminate picture distortion and degradation by skipping skip-enabled pictures.

According to an aspect of the present invention, there is provided an apparatus for video synchronization, the apparatus including a PTS register storing a presentation time stamp (PTS) of a picture to be reproduced and skip enable flag information indicating whether the picture can be skipped, by using a position of the picture in a video decoder buffer in which pictures to be decoded are stored; and a controller controlling the picture reproduction by skipping, repeating, or reproducing the picture with reference to the PTS and the skip enable flag information stored in the PTS register.

According to an aspect of the present invention, the skip enable flag is set to a value representing that the picture can be skipped, if the picture is a B-type picture, or a picture to be reproduced next to the picture is an I-type picture.

According to an aspect of the present invention, the controller controls the picture to be skipped if a difference StcPtsDiff between a system time clock STC and the PTS value is greater than a predetermined threshold value Th_f and the skip enable flag indicates that the picture is skip-enabled.

According to an aspect of the present invention, the controller controls the picture to be reproduced repeatedly if the StcPtsDiff is less than Th_f.

According to an aspect of the present invention, the controller controls the picture to be reproduced if the StcPtsDiff is greater than the Th_f but the skip enable flag indicates that the picture is skip-disabled, or if the StcPtsDiff is between −Th_f and Th_f.

According to another aspect of the present invention, there is provided an apparatus for video synchronization, the apparatus including: a controller controlling the reproduction of a picture; a picture header extractor detecting from a video elementary stream a position of the picture in a video decoder buffer in which pictures to be decoded are stored, detects the type of the picture; a picture header queue storing the position and the type of the picture; a presentation time stamp (PTS) queue storing the position of the picture and PTS of the picture; and a PTS register storing the PTS of the picture to be reproduced and skip enable flag information that indicates whether the picture is skip-enabled or not, wherein the controller controls reproduction of the picture by skipping, repeating, or reproducing the picture with reference to the PTS of the picture and the skip enable flag information.

According to a still another aspect of the present invention, there is provided a method of video synchronization, including: obtaining skip enable flag information by selecting a picture having the same position as is stored in a picture header queue from a video decoder buffer where pictures to be decoded are stored, and determining whether the picture is skip-enabled or not according to a stored type of the picture, obtaining PTS of the picture in a presentation time stamp (PTS) and storing the skip enable flag and the PTS; and controlling picture reproduction by skipping, repeating, or reproducing a picture with reference to the stored PTS and skip enable flag.

According to an aspect of the present invention, the skip enable flag is set to a value representing that the picture can be skipped if the picture is a B-type picture or a picture to be reproduced next to the picture is an I-type picture.

According to an aspect of the present invention, controlling the picture reproduction comprises controlling the picture to be skipped if a difference StcPtsDiff between a system time clock STC and the PTS is greater than a predetermined threshold value Th_f and the skip enable flag indicates that the picture is skip-enabled.

According to an aspect of the present invention, controlling the picture reproduction comprises controlling the picture to be reproduced repeatedly if the StcPtsDiff is less than Th_f.

According to an aspect of the present invention, the method further includes controlling the picture to be reproduced, if the StcPtsDiff is greater than the Th_f but the skip enable flag indicates that the picture is skip-disabled, or if the StcPtsDiff is between −Th_f and Th_f.

According to an aspect of the present invention, the method includes detecting from a video elementary stream a position of a picture in a video decoder buffer where pictures to be decoded are stored and a type of the picture, and storing them; storing the position and a PTS of the picture; determining whether the picture can be skipped based on the type and PTS of the picture and storing a skip enable flag resulting from the determination and the PTS of the picture in a PTS register; and controlling picture reproduction by skipping, repeating, or reproducing the picture with reference to the skip enable flag and the PTS of the picture stored in the PTS register.

According to an aspect of the present invention, at least one computer readable medium storing instructions that control at least one processor to perform a method of video synchronization including obtaining skip enable flag information by selecting a picture having the same position as is stored in a picture header queue from a video decoder buffer where pictures to be decoded are stored, and determining whether the picture is skip-enabled or not according to a stored type of the picture, obtaining PTS of the picture in a presentation time stamp (PTS) and storing the skip enable flag and the PTS; and controlling picture reproduction by skipping, repeating, or reproducing a picture with reference to the stored PTS and skip enable flag.

According to an aspect of the present invention, at least one computer readable medium storing instructions that control at least one processor to perform a method of video synchronization including detecting from a video elementary stream a position of a picture in a video decoder buffer where pictures to be decoded are stored and a type of the picture, and storing them; storing the position and a PTS of the picture; determining whether the picture can be skipped based on the type and PTS of the picture and storing a skip enable flag resulting from the determination and the PTS of the picture in a PTS register; and controlling picture reproduction by skipping, repeating, or reproducing the picture with reference to the skip enable flag and the PTS of the picture stored in the PTS register.

BRIEF DESCRIPTION OF THE DRAWINGS

These and/or other aspects, features, and advantages of the invention will become apparent and more readily appreciated from the following description of the exemplary embodiments, taken in conjunction with the accompanying drawings of which:

FIG. 4 shows a structure of an exemplary embodiment of a picture header queue of FIG. 2;

FIG. 5 shows an exemplary embodiment of a structure of a PTS queue of FIG. 2;

DETAILED DESCRIPTION OF THE PREFERRED EMBODIMENTS

Figure 1:
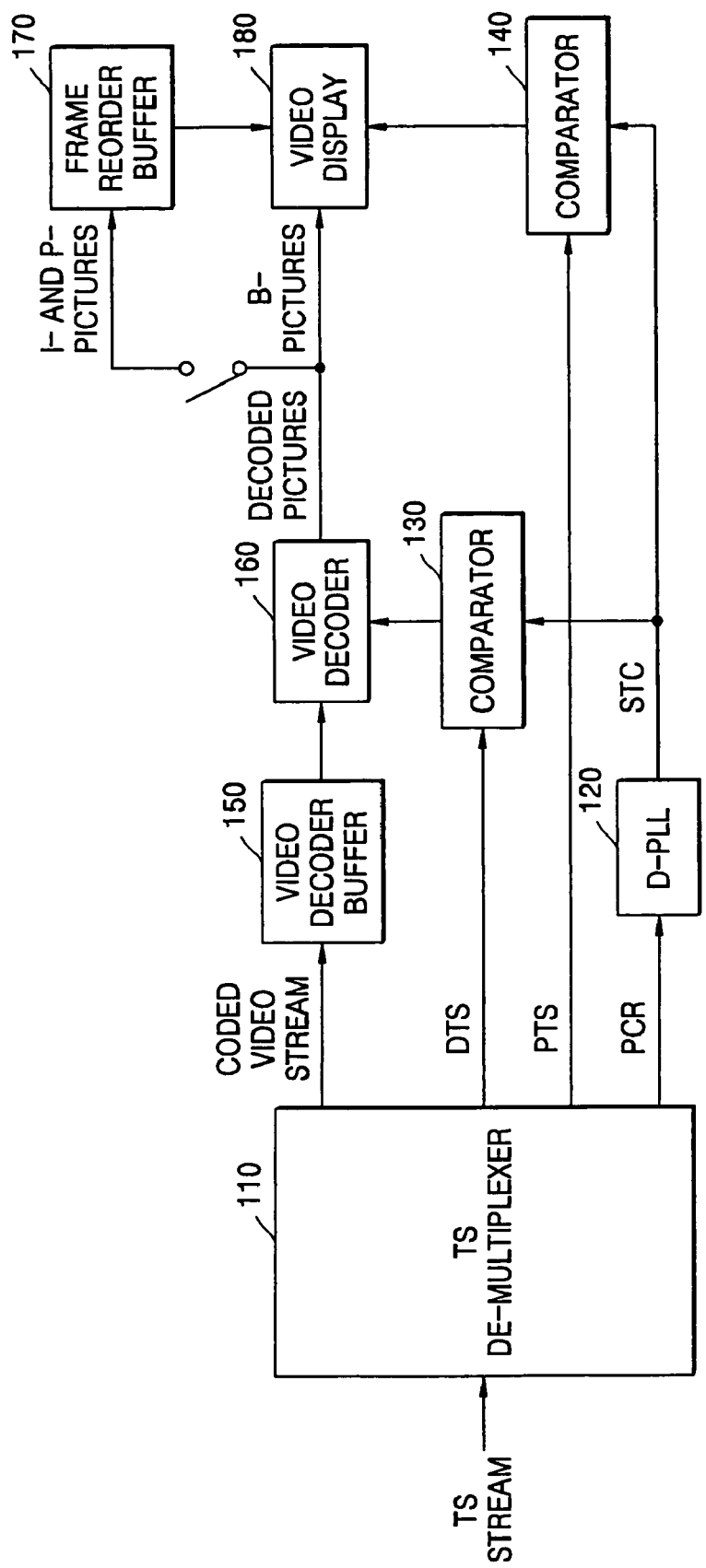
FIG. 1 is a schematic block diagram of a conventional digital broadcast receiver.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
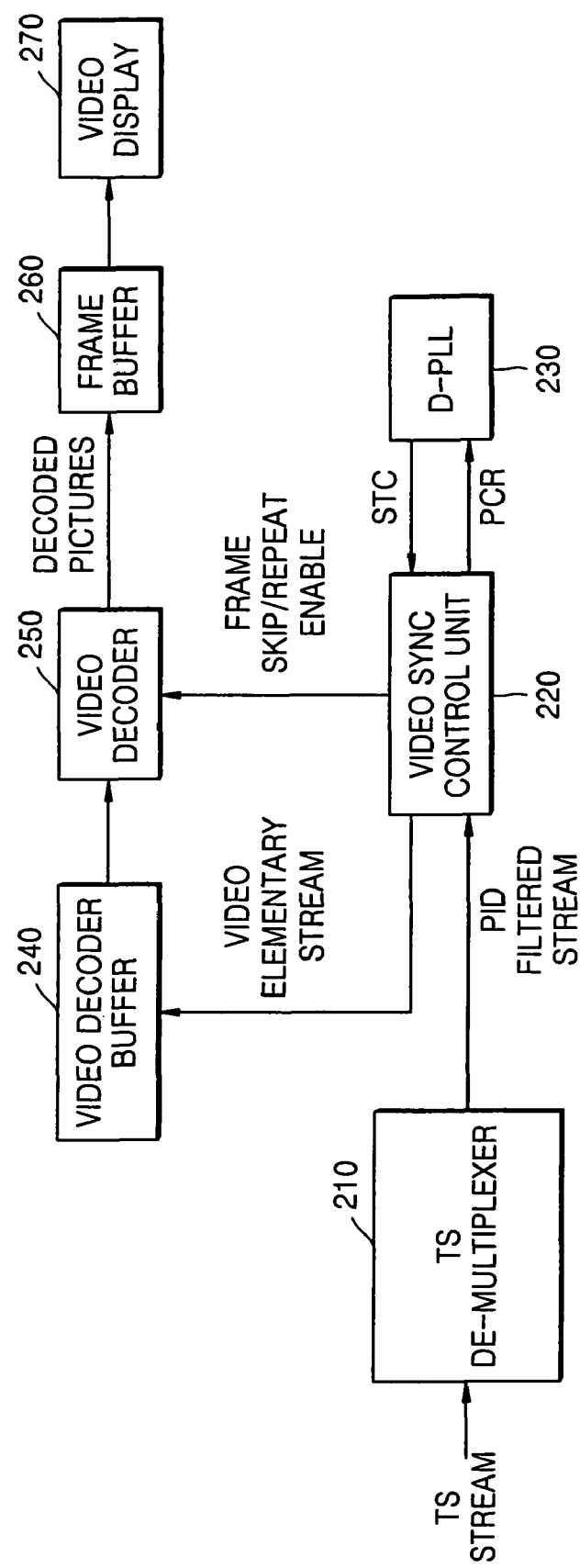
FIG. 2 is a schematic block diagram of a digital broadcast receiver according to an exemplary embodiment of the present invention.

FIG. 2 is a schematic block diagram of a digital broadcast receiver according to an exemplary embodiment of the present invention.

Referring to FIG. 2, the digital broadcast receiver includes a TS de-multiplexer 210, a video sync control unit 220, a digital phase locked loop (D-PLL) 230, a video decoder buffer 240, a video decoder 250, a frame buffer 260, and a video display 270.

The TS de-multiplexer 210 receives a transmitted video stream, de-multiplexes a plurality of programs from the transmitted video stream, and extracts a time stamp for video picture decoding and reproducing. In addition, the TS de-multiplexer 210 filters and extracts from an incoming transport stream data packets having certain Packet Identifier (PID) values, and the TS de-multiplexer supplies a PID filtered stream to video sync control unit 220.

The video decoder buffer 240 stores encoded video data provided by the video sync control unit 220.

The video decoder 250 decodes the video data received from the video decoder buffer 240 into a picture image.

The frame buffer 260 stores the picture image decoded by the video decoder 250 before display.

The video display 270 displays the picture image from the frame buffer 260.

The D-PLL 230 synchronizes a reference frequency of the receiver with that of a transmitter according to a PCR received from the video sync control unit 220.

In particular, the video sync control unit 220 stores flag information about a type (e.g., I, B, or P type) of a picture to be decoded, a position where the picture is stored in the video decoder buffer 240, a presentation time stamp PTS, and flag information about whether the picture is skip-enabled. The video sync control unit 220 compares a decoding time stamp DTS and the PTS with a system time clock STC to generate a control signal for timing of decoding and reproducing.

Figure 3:
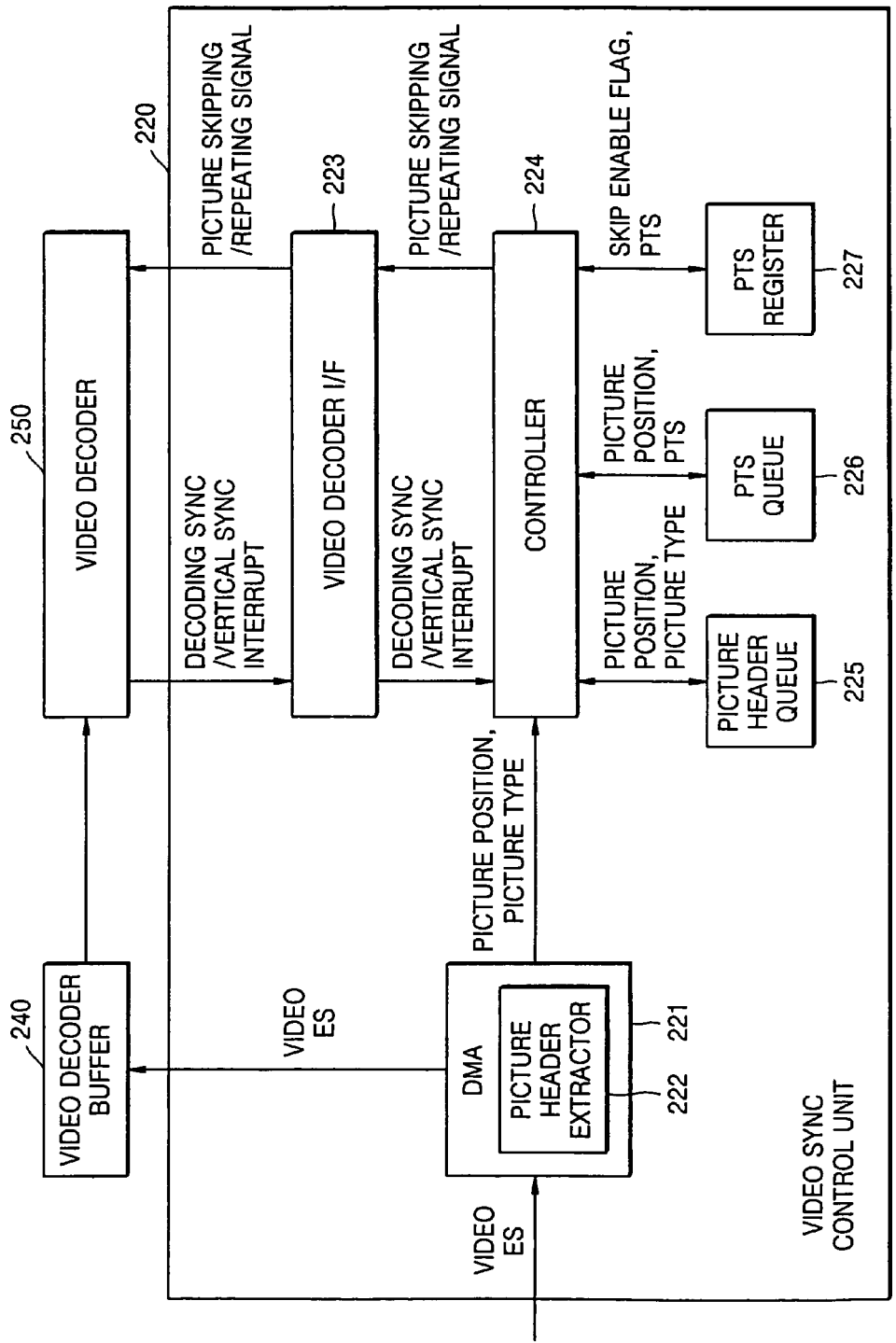
FIG. 3 is a detailed block diagram of an exemplary embodiment of a video synch control unit of FIG. 2.

FIG. 3 is a detailed block diagram of the video sync control unit 220 of FIG. 2 according to an exemplary embodiment of the present invention.

Referring to FIG. 3, the video sync control unit 220 includes a direct memory access (DMA) 221, a video decoder interface (IF) 223, a controller 224, a picture header queue 225, a PTS queue 226, and a PTS register 227.

The DMA 221 extracts a header from a video elementary stream received from the TS multiplexer 210 of FIG. 2, and forwards the video elementary stream (ES) to the video decoder buffer 240. A picture header extractor 222 of the DMA 221 searches for a picture header from the video ES to extract the picture type, and informs the controller 224 about a position where the picture is stored in the video decoder buffer 240. Such information about the position where the picture is stored in the video decoder buffer 240 and the picture type helps the controller 224 determine whether to skip the picture. In addition, since the array of the video ES is forwarded to the video decoder buffer 240 as is without change and the position where the picture is stored in the video decoder buffer is monitored, it becomes easy to implement the receiver.

The video decoder IF 223 is an interface module between the controller 224 and the video decoder 250, which connects a decoding sync signal and a vertical sync signal input from the video decoder 250 to interrupt terminals of the controller 224, and provides picture motion control information, that is, a picture skip signal or a picture repeat signal for the video decoder 250. Though actual reproduction is showed on the video display 270, the reproduction control is performed by the video decoder 250, and thus the picture skipping, repeating, or reproduction signal is to be forwarded to the video decoder 250.

The controller 224 stores the picture type input from the picture header extractor 221 and the corresponding picture's position in the video decoder buffer in the picture header queue 225, and stores the PTS and the corresponding picture's position in the video decoder buffer in the PTS queue 226. According to decoding sync and vertical sync signals output by the video decoder, the controller 224 obtains a difference between PTS and STC of a corresponding picture, and determines the skip enable flag based on the picture type. Using the difference and the skip enable flag, the controller 224 sends a skipping/repeating signal to the video decoder 250.

The picture header queue 225 stores the picture type and the corresponding picture's position in the video decoder buffer output by the controller 224.

The PTS queue 226 stores the PTS and the corresponding picture's position in the video decoder buffer output by the controller 224 until the corresponding picture is actually reproduced.

The controller 224 compares a position of the picture to be read from the video decoder buffer 240 to the picture's position stored in the picture header queue to select a corresponding picture when the decoding sync signal is input from the video decoder IF 233, and stores a skip enable flag indicating whether the selected picture is skip-enabled in the PTS register 227. Further, the controller 224 compares the position of the picture to be read from the video decoder buffer 240 to the picture's position stored in the PTS queue to select a corresponding picture, and stores the PTS of the selected picture in the PTS register 227. Here, the skip enable flag is set to '1' when the corresponding picture to be decoded is a B-type picture or when the next picture to be decoded is an I-type picture, and the PTS stored in the PTS register is finally compared to the STC.

FIG. 4 shows a structure of the picture header queue 225 of an exemplary embodiment of the present invention.

The picture header queue 225 stores the picture type and the picture's position in the video decoder buffer. Referring to FIG. 4, in the picture header queue 225, for example, an I-type picture is stored corresponding to the picture's position 100, a P-type picture is stored corresponding to the picture's position 200, a B-type picture is stored corresponding to the picture's position 400, a P-type picture is stored corresponding to the picture's position 700, and a I-type picture is stored corresponding to the picture's position 800.

FIG. 5 shows a structure of the PTS queue 226 according to an exemplary embodiment of the present invention.

The PTS queue 226 stores the picture's PTS and the picture's position in the video decoder buffer. Referring to FIG. 5, in the PTS queue 226, for example, PTS 100 is stored corresponding to the picture's position 100, PTS 200 is stored corresponding to the picture's position 400, and PTS 300 is stored corresponding to the picture's position 700.

Figures 6, 7:
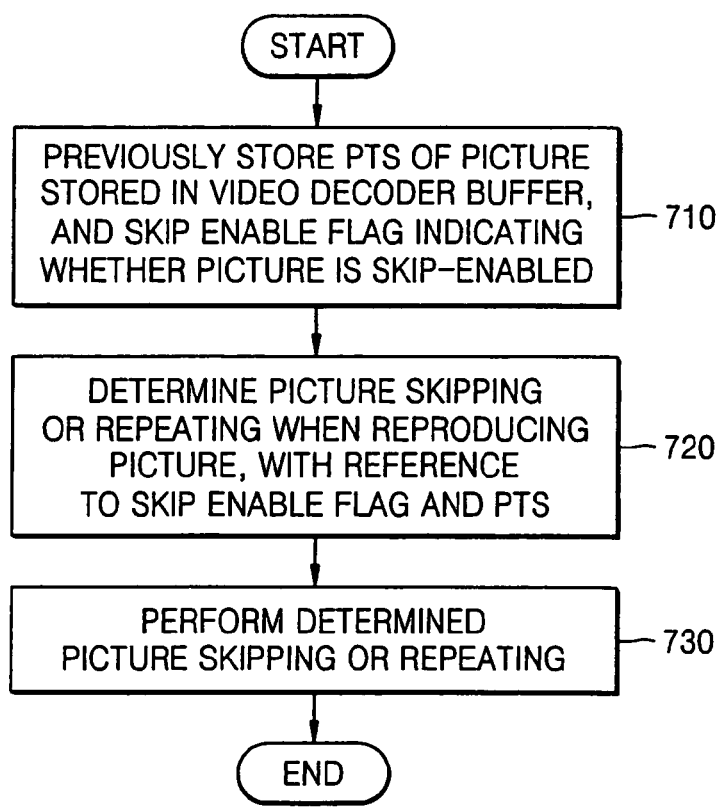
FIG. 6 shows an exemplary embodiment of a structure of a PTS register of FIG. 2.
FIG. 7 is a flowchart of a method of video synchronization according to an exemplary embodiment of the present invention.

FIG. 6 shows a structure of the PTS register 227 according to an exemplary embodiment of the present invention.

The PTS register 227 stores the PTS of the picture to be reproduced, and the skip enable flag. The skip enable flag is determined on the basis of the contents stored in the PTS queue 226 as shown in FIG. 5. In other words, the skip enable flag is set to "1" if a current picture to be reproduced is a B-type picture or the next picture to be reproduced is an I-type picture. As such, the skip enable flag indicates whether the current picture can be skipped or not. Here, since a B-type picture or the final picture of GOP can generally be skipped, it is preferable that the skip enable flag is assigned on such a basis.

Referring to FIG. 6, a skip enable flag for a picture whose PTS is 100 is set to be "0" since the picture, positioned at 100 in the video decoder buffer, is I-type. A skip enable flag for a picture whose PTS is 200 is set to be "1" since the picture, positioned at 400 in the video decoder buffer, is B-type. And, a skip enable flag for a picture whose PTS is 300 and positioned at 700 in the video decoder buffer is set to be "1" since the next picture to be reproduced is I-type.

Meanwhile, since the PTS is periodically input along the video ES, some pictures may not have their PTS value. For example, referring to FIG. 4, the picture positioned at 200 in the video decoder buffer has no PTS value, and thus PTS information of the picture does not exist in the PTS queue of FIG. 5. For pictures without their PTS, the PTS can be made up and then stored in the PTS register by compensating neighboring pictures' PTS. However, in the above exemplary embodiment, pictures without their PTS are simply not stored in the PTS register 227, to thus be reproduced as is, regardless of their PTS values.

FIG. 7 is a flowchart of a method of video synchronization according to an exemplary embodiment of the present invention.

Referring to FIG. 7, first, each picture's PTS, and a skip enable flag for a corresponding picture are stored in advance in operation 710. Before storing the skip enable flag, pre-processing is performed by storing each type of pictures to be stored in the video decoder buffer in advance, determining corresponding skip enable flags according to the type of a picture to be currently or next reproduced, and storing the resulting skip enable flag with the PTS of the corresponding picture. Storing each picture's type is triggered by a picture header interrupt, and determining and storing the skip enable flag are triggered by a sync interrupt, as will be described later.

In reproducing a picture, it is determined whether to perform skipping or repeating on the picture with reference to the stored PTS and the skip enable flag in operation 720. Vertical sync interrupt triggers the operation as will be described later.

According to the determined result in operation 720, it is determined whether to perform skipping/repeating or reproduce the picture in operation 730.

On the other hand, storing the type and the position of the picture in the picture header queue, and storing the PTS of a picture to be reproduced in the PTS register, are performed during a predetermined interrupt procedure, as will be described later. However, since a PTS is information that is naturally extracted from the TS de-multiplexer according to the MPEG system standard, storing a PTS and the position of the picture does not need any interrupt procedure. Instead, they are just taken from the controller.

Figure 8:
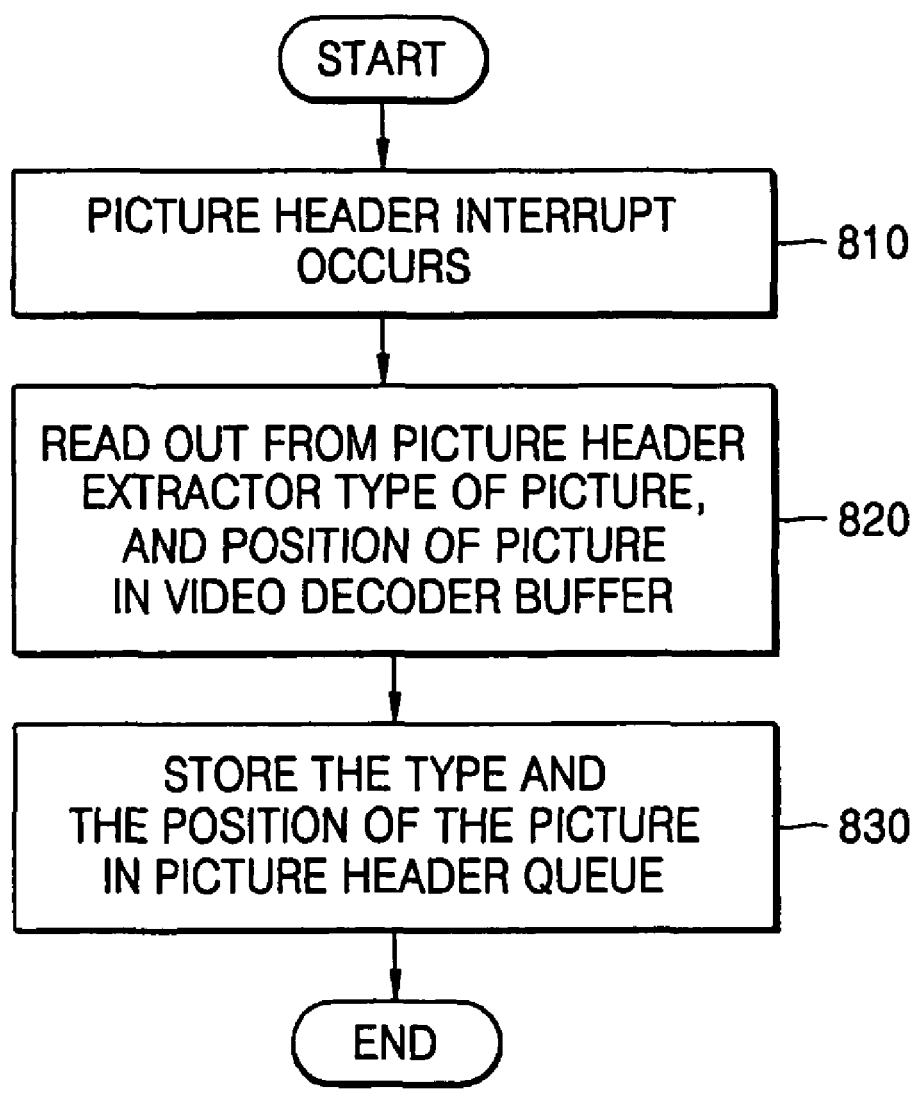
FIG. 8 is a flowchart of a procedure for handling a picture header interrupt used for a method of video synchronization according to an exemplary embodiment of the present invention.

FIG. 8 is a flowchart of a procedure of the picture header interrupt used for a method of video synchronization according to an exemplary embodiment of the present invention.

In operation 810, the picture header interrupt occurs as the controller 224 receives the picture header interrupt from the picture header extractor 222. In operation 820, the controller 224 reads out a type of a corresponding picture and the picture's position in the video decoder buffer 240.

Next, the controller 224 stores the read out picture type and the position in the picture header queue 225 in operation 830.

Figure 9:
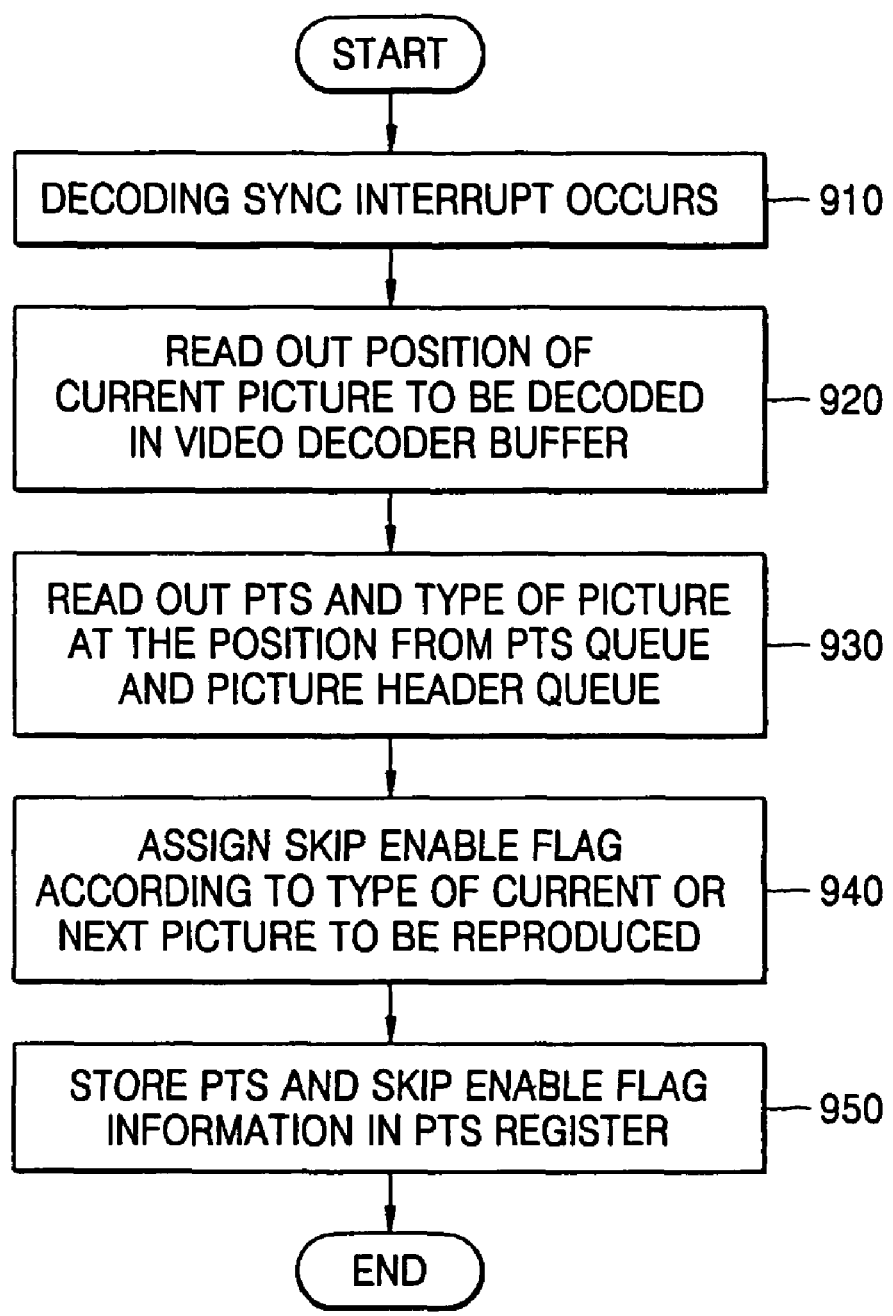
FIG. 9 is a flowchart of a procedure for handling a decoding sync interrupt used for a method of video synchronization according to an exemplary embodiment of the present invention.

FIG. 9 is a flowchart of a procedure of the decoding sync interrupt used for a method of video synchronization according to an exemplary embodiment of the present invention.

In operation 910, the decoding sync interrupt occurs as the controller 224 receives the decoding sync interrupt from the video decoder 250 via the video decoder IF 223. In operation 920, the controller 224 reads out the position of a picture to be decoded from the video decoder buffer 240, which is a video read pointer.

In operation 930, the controller 224 reads out a PTS of the corresponding picture from the PTS queue 226, and the corresponding picture type from the picture header queue 225.

Since the picture type and the PTS are stored with a corresponding position of the picture in the PTS queue 226 and the picture header queue 225, the controller 224 uses the position in the video decoder buffer 240 to find the type and the PTS of the corresponding picture.

In operation 940, a skip enable flag is determined according to the picture type of the picture to be decoded or a type of the next picture to be reproduced. Here, if the type of the corresponding picture is B-type or the final picture of GOP, that is, the type of the corresponding picture is P-type and the type of the next picture to be reproduced is I-type, the skip enable flag is determined to be "1".

In operation 950, the PTS of the corresponding picture, and the determined skip enable flag, are stored in the PTS register 227.

Figure 10:
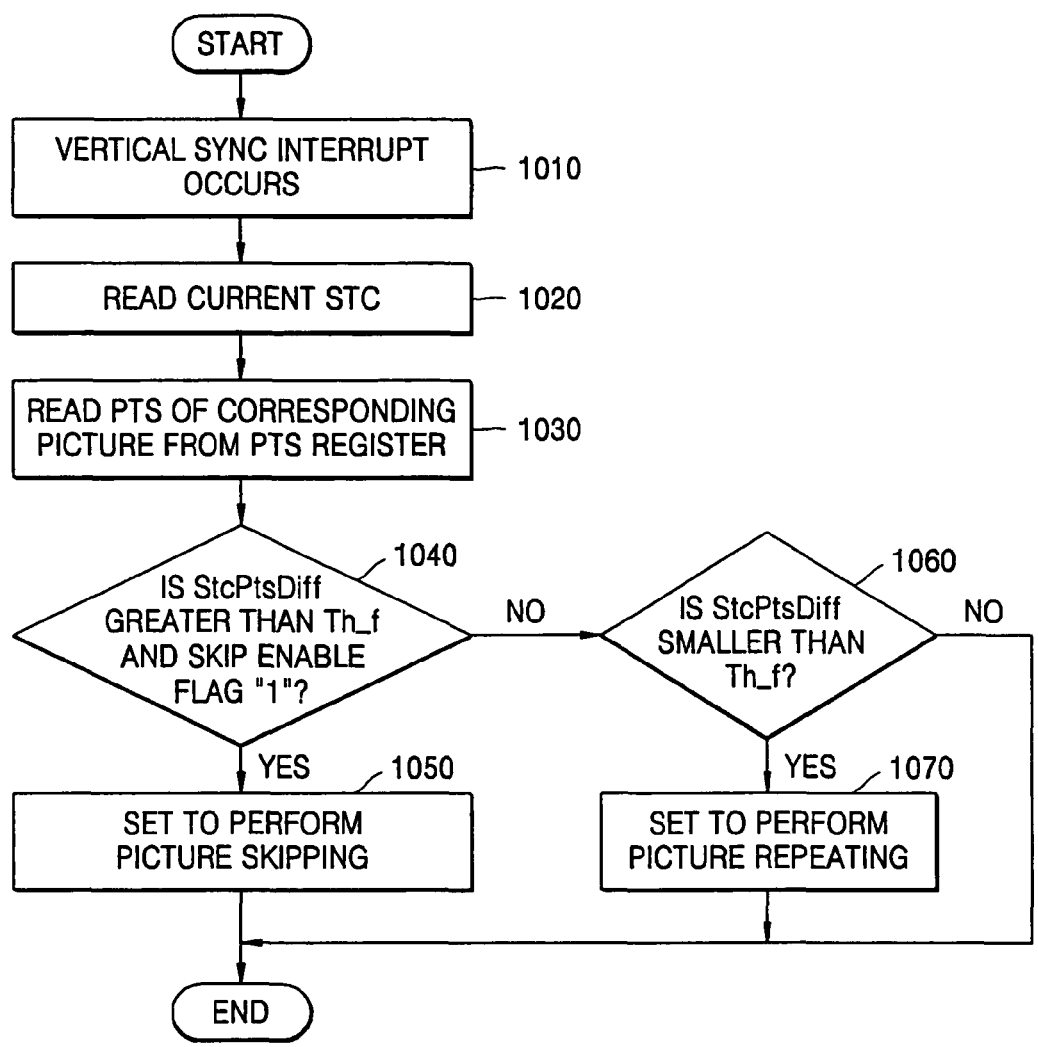
FIG. 10 is a flowchart of a procedure for handling a vertical sync interrupt used for a method of video synchronization according to an exemplary embodiment of the present invention.

FIG. 10 is a flowchart of the vertical sync interrupt procedure used for the method of video synchronization according to an exemplary embodiment of the present invention.

In operation 1010, the vertical sync interrupt occurs as the controller 224 receives the vertical sync interrupt request from the video decoder 250 via the video decoder IF 223.

In operation 1020, the controller 224 reads out a current STC from D-PLL 230.

Next, in operation 1030, the controller reads out the PTS of a corresponding picture from the PTS register 227 and calculates a difference StcPtsDiff between the STC and the PTS.

In operation 1040, it is determined whether StcPtsDiff is greater than a predetermined threshold Th_f and the skip enable flag has been set to be "1".

When it is determined that StcPtsDiff is greater than the predetermined threshold Th_f and the skip enable flag has been set to be "1" in operation 1040, it is determined to skip over the picture and a command of picture skipping occurs in operation 1050. Here, the Th_f is determined by the accuracy of video synchronization.

When it is determined that StcPtsDiff is not greater than the Th_f, or the skip enable flag is not set to "1" in operation 1040, it is checked whether StcPtsDiff is smaller than Th_f in operation 1060.

When it is determined that StcPtsDiff is smaller than Th_f in operation 1060, it is determined to perform picture repeating over the picture and a command of picture repeating occurs in operation 1070.

When it is determined that StcPtsDiff is greater than Th_f in operation 1060 but the skip enable flag is not "1", that is, when it comes to a situation where it is time to skip the corresponding picture in terms of its PTS but the picture is too important to be skipped, the vertical sync interrupt is ended and the picture is reproduced as is.

Further, when it is determined that StcPtsDiff is smaller than Th_f and is greater than −Th_f (between −Th_f and Th_f), it is determined to reproduce the picture as is.

In order to prevent an overflow of incoming video pictures and to perform lip sync, picture skipping is needed. It is preferable to skip only the B-type picture or the final picture of GOP if the picture is not a reference picture. According to exemplary embodiments of the present invention, described above, a picture to be skipped may be checked and determined in advance at a stream decoder stage before a video decoder, and the picture skipping may be performed on a proper skip-enabled picture at the video decoder, thereby preventing picture distortion and screen degradation.

It is possible for methods of video synchronization according to the present invention to be implemented as a computer program, which can be executed by one or more computing devices or processors. Codes and code segments constituting the computer program may readily be inferred by those skilled in the art.

In addition to the above described exemplary embodiments, exemplary embodiments of the present invention can be implemented by executing computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code is stored/transferred and executed in a distributed fashion.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for video synchronization, the apparatus comprising:
    a presentation time stamp (PTS) register to store a presentation time stamp (PTS) of a picture to be reproduced and skip enable flag information indicating whether the picture can be skipped, by using a position of the picture in a video decoder buffer in which pictures of a video stream to be decoded are stored without change; and
    a controller to control the picture reproduction by skipping, repeating, or reproducing the picture with reference to the PTS and the skip enable flag information stored in the PTS register.

2. The apparatus of claim 1, wherein the skip enable flag is set to a value representing that the picture can be skipped, if the picture is a B-type picture, or a picture to be reproduced next to the picture is an I-type picture.

3. The apparatus of claim 1, wherein the controller controls the picture to be skipped if an absolute difference between a system time clock STC and the PTS value is greater than a predetermined threshold value Th_f and the skip enable flag indicates that the picture is skip-enabled.

4. The apparatus of claim 3, wherein the controller controls the picture to be reproduced repeatedly if the absolute difference is less than Th_f.

5. The apparatus of claim 3, wherein the controller controls the picture to be reproduced if the absolute difference is greater than the Th_f but the skip enable flag indicates that the picture is skip-disabled.

6. An apparatus for video synchronization, the apparatus comprising:
    a controller to control the reproduction of a picture;
    a picture header extractor to detect from a video elementary stream a position of the picture in a video decoder buffer in which pictures to be decoded are stored without change, and to detect the type of the picture;
    a picture header queue to store the position and the type of the picture;
    a presentation time stamp (PTS) queue to store the position of the picture and PTS of the picture; and
    a PTS register to store the PTS of the picture to be reproduced and skip enable flag information that indicates whether the picture is skip-enabled or not,
    wherein the controller controls reproduction of the picture by skipping, repeating, or reproducing the picture with reference to the PTS of the picture and the skip enable flag information.

7. The apparatus of claim 1, wherein:
    the controller controls the picture to be skipped if a system time clock STC value minus a PTS value is greater than a predetermined threshold value Th_f and the skip enable flag indicates that the picture is skip-enabled; and
    the controller controls the picture to be reproduced if the STC value minus the PTS value is between −Th_f and Th_f.

8. The apparatus of claim 1, wherein:
    the controller controls the picture to be skipped if a PTS value minus a system time clock STC value is greater than a predetermined threshold value Th_f and the skip enable flag indicates that the picture is skip-enabled; and
    the controller controls the picture to be reproduced if the PTS value minus the STC value is between −Th_f and Th_f.

9. A method of video synchronization, the method comprising:
    obtaining skip enable flag information by selecting a picture having the same position as is stored in a picture header queue from a video decoder buffer where pictures of a video stream to be decoded are stored without change, and determining whether the picture is skip-enabled or not according to a stored type of the picture, obtaining PTS of the picture in a presentation time stamp (PTS) and storing the skip enable flag and the PTS; and
    controlling picture reproduction by skipping, repeating, or reproducing a picture with reference to the stored PTS and skip enable flag,
    wherein the PTS and skip enable flag are stored in a PTS register.

10. The method of claim 9, wherein the skip enable flag is set to a value representing that the picture can be skipped if the picture is a B-type picture or a picture to be reproduced next to the picture is an I-type picture.

11. The method of claim 9, wherein controlling the picture reproduction comprises controlling the picture to be skipped if an absolute difference between a system time clock STC and the PTS is greater than a predetermined threshold value Th_f and the skip enable flag indicates that the picture is skip-enabled.

12. The method of claim 11, wherein controlling the picture reproduction comprises controlling the picture to be reproduced repeatedly if the absolute difference is less than Th_f.

13. The method of claim 11, further comprising controlling the picture to be reproduced, if the absolute difference is greater than the Th_f but the skip enable flag indicates that the picture is skip-disabled.

14. The method of claim 9, wherein:
    controlling the picture reproduction comprises controlling the picture to be skipped if a system time clock STC value minus a PTS value is greater than a predetermined threshold value Th_f and the skip enable flag indicates that the picture is skip-enabled; and
    the method further comprises controlling the picture to be reproduced, if the STC value minus the PTS value is between −Th_f and Th_f.

15. The method of claim 9, wherein:
controlling the picture reproduction comprises controlling the picture to be skipped if a PTS value minus a system time clock STC value is greater than a predetermined threshold value Th_f and the skip enable flag indicates that the picture is skip-enabled; and
the method further comprises controlling the picture to be reproduced, if the PTS value minus the STC value is between −Th_f and Th_f.

16. A method of video synchronization, the method comprising:
detecting from a video elementary stream a position of a picture in a video decoder buffer where pictures to be decoded are stored without change and a type of the picture, and storing them;
storing the position and a PTS of the picture;
determining whether the picture can be skipped based on the type and PTS of the picture and storing a skip enable flag resulting from the determination and the PTS of the picture in a PTS register; and
controlling picture reproduction by skipping, repeating, or reproducing the picture with reference to the skip enable flag and the PTS of the picture stored in the PTS register.

17. At least one non-transitory computer readable medium storing instructions that control at least one processor to perform a method of video synchronization, comprising:
obtaining skip enable flag information by selecting a picture having the same position as is stored in a picture header queue from a video decoder buffer where pictures of a video stream to be decoded are stored without change, and determining whether the picture is skip-enabled or not according to a stored type of the picture, obtaining PTS of the picture in a presentation time stamp (PTS) and storing the skip enable flag and the PTS; and
controlling picture reproduction by skipping, repeating, or reproducing a picture with reference to the stored PTS and skip enable flag,
wherein the PTS and skip enable flag are stored in a PTS register.

18. At least one non-transitory computer readable medium storing instructions that control at least one processor to perform a method of video synchronization comprising:
detecting from a video elementary stream a position of a picture in a video decoder buffer where pictures to be decoded are stored without change and a type of the picture, and storing them;
storing the position and a PTS of the picture; determining whether the picture can be skipped based on the type and PTS of the picture and storing a skip enable flag resulting from the determination and the PTS of the picture in a PTS register; and
controlling picture reproduction by skipping, repeating, or reproducing the picture with reference to the skip enable flag and the PTS of the picture stored in the PTS register.

* * * * *